US012372965B2

(12) United States Patent
Copenspire-Ross et al.

(10) Patent No.: US 12,372,965 B2
(45) Date of Patent: Jul. 29, 2025

(54) CLEANING DETECTION SYSTEM

(71) Applicant: Micron Technology, Inc., Boise, ID (US)

(72) Inventors: Lisa R. Copenspire-Ross, Boise, ID (US); Amber Thompson, Meridian, ID (US); Amber Huddleston, Kuna, ID (US); Qianlan Liu, Boise, ID (US); Charlotte Singleton, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 17/407,259

(22) Filed: Aug. 20, 2021

(65) Prior Publication Data
US 2023/0057027 A1    Feb. 23, 2023

(51) Int. Cl.
*G05D 1/00* (2024.01)
*G05B 19/4155* (2006.01)

(52) U.S. Cl.
CPC ....... *G05D 1/0219* (2013.01); *G05B 19/4155* (2013.01); *G05D 1/0225* (2013.01); *G05B 2219/45098* (2013.01)

(58) Field of Classification Search
CPC .............. G05D 1/0219; G05D 1/0225; G05D 2201/0203; G05D 2201/0215; G05B 19/4155; G05B 2119/45098
See application file for complete search history.

(56) References Cited

U.S. PATENT DOCUMENTS

| | | | | |
|---|---|---|---|---|
| 5,959,423 | A * | 9/1999 | Nakanishi | A47L 11/305 318/568.25 |
| 9,043,021 | B1 * | 5/2015 | Clark | G06F 16/2365 901/1 |
| 9,114,440 | B1 * | 8/2015 | Colucci | B25J 9/1676 |
| 2011/0202175 | A1 * | 8/2011 | Romanov | A47L 11/4036 700/250 |
| 2014/0278252 | A1 * | 9/2014 | Wold | G01N 27/048 702/189 |
| 2018/0194006 | A1 * | 7/2018 | Gu | A47L 9/2826 |
| 2018/0361583 | A1 * | 12/2018 | Williams | G05D 1/0219 |
| 2020/0249688 | A1 * | 8/2020 | Caussy | H02J 7/00034 |
| 2021/0022578 | A1 * | 1/2021 | Koebrick | A47L 11/4072 |
| 2021/0169294 | A1 | 6/2021 | Pruiett | |
| 2021/0186282 | A1 | 6/2021 | Mathieu | |
| 2021/0204775 | A1 | 7/2021 | Ashbaugh | |

(Continued)

*Primary Examiner* — Thomas E Worden
*Assistant Examiner* — Blake A Wood
(74) *Attorney, Agent, or Firm* — Brooks, Cameron & Huebsch, PLLC

(57) ABSTRACT

Apparatuses, machine-readable media, and methods related to cleaning detection are described. A cleaning detection system can be used to determine whether there is a need for cleaning by comparing detection inputs, from sensors of the cleaning detection system, that are associated with an updated status of an area to a baseline status of an area. The cleaning detection system can receive a number of initial inputs associated with an area scanned by the device, determine a baseline status of the area based on the number of initial inputs, receive a number of detection inputs associated with the area scanned by the device, and determine whether a location of the area is in need of cleaning based on a comparison of the baseline status and the number of detection inputs.

20 Claims, 5 Drawing Sheets

(56) References Cited

U.S. PATENT DOCUMENTS

| | | |
|---|---|---|
| 2021/0219806 A1 | 7/2021 | Davila |
| 2021/0228049 A1 | 7/2021 | Ruffo |
| 2021/0228050 A1 | 7/2021 | Zhang |
| 2021/0282613 A1* | 9/2021 | Fong .................. A47L 11/4011 |

* cited by examiner

CLEANING DETECTION SYSTEM

TECHNICAL FIELD

The present disclosure relates generally to apparatuses, non-transitory machine-readable media, and methods for cleaning detection.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be used to transmit information to users via a display to view images and/or text, speakers to emit sound, and/or a sensors to collect data. A computing device can receive inputs from sensors on or coupled to the computing device. The computing device can be coupled to a number of other computing devices and can be configured to communicate (e.g., send and/or received data) with the other computing devices and/or to a user of the computing device.

DETAILED DESCRIPTION

Figure 1:
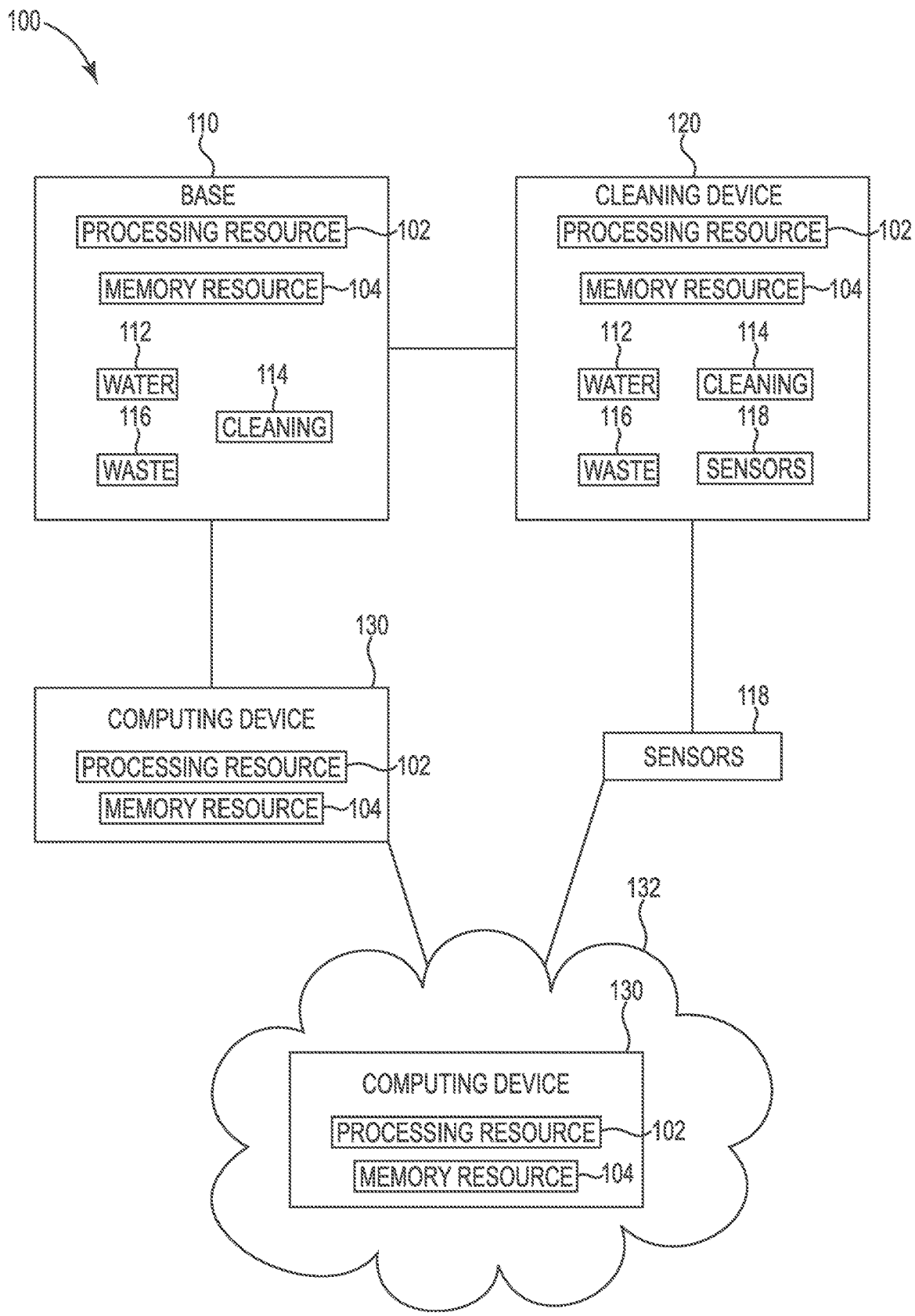
FIG. 1 is a functional diagram representing an example system for cleaning detection in accordance with a number of embodiments of the present disclosure.

Apparatuses, machine-readable media, and methods related to cleaning detection are described. A cleaning detection system can be used to determine whether there is a need for cleaning by comparing detection inputs that are associated with an updated status of an area to a baseline status of the area. The cleaning detection system can receive a number of initial inputs associated with an area scanned by the device, determine a baseline status of the area based on the number of initial inputs, receive a number of detection inputs associated with the area scanned by the device, and determine whether a location of the area is in need of cleaning based on a comparison of the baseline status and the number of detection inputs.

Computing devices (e.g., mobile devices and/or modules having a computing device) and/or devices (e.g., cleaning devices and/or cleaning device base stations) having a computing device can be configured to run an application (e.g., a cleaning detection tool) to determine whether an area needs to be cleaned according to examples of the present disclosure.

The cleaning detection tool can receive initial inputs associated with an area that the cleaning detection system is monitoring. The initial inputs can be used by the cleaning detection system to determine the baseline status of the area. The baseline status of the area can be associated with a clean status of the area (e.g., the area is not in need of cleaning).

The cleaning detection system can then monitor the area using sensors, such as image sensors, moisture sensors, and/or proximity sensors, among other types of sensors. The sensors can be located on the cleaning device, the base station, and/or throughout the area that is being monitored. The cleaning detection system can monitor the area continuously, at periodic intervals, and/or in response to an input from a user, for example. The cleaning detection system can receive detection inputs from the sensors when monitoring the area, determine an updated status of the area, and compare the updated status to the baseline status to determine if a location of the area is need of a cleaning. When the cleaning detection system determines there is a difference between the updated status and the baseline status that indicates a location of the area is need of a cleaning, the cleaning detection system can send instructions to the cleaning device to perform a cleaning operation. The cleaning device can execute the instruction to perform the cleaning operation using cleaning tools on the cleaning device (e.g., a vacuum, a cleaning brush, and/or cleaning products, among cleaning tools). Once the cleaning operation is complete, the cleaning detection system can monitor the area again using the sensor to determine a post cleaning updated status of the area. The post cleaning operation update status can be compared to the baseline status and/or the pre-cleaning operation updated status to determine if the cleaning operation was successful. If the cleaning operation was not successful (e.g., the comparison of the post cleaning operation update status to the baseline status and/or the pre-cleaning operation updated status indicates that the location still needs to be cleaned), another cleaning operation can be performed.

The cleaning detection system can be used to monitor the status of an area so that the area can be cleaned by a cleaning device without intervention by a user of the cleaning detection system and can be done during times when the area is not being used by others. Therefore, the cleaning detection tool allows the area to be cleaned during times that are not an inconvenience to the users of the area and such that the area is available when the users of the area desire. Also, the cleaning detection tool allows the user to not be burdened with scheduling cleanings; or be burdened with having to performing the cleaning.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2A. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing an example system for cleaning detection in accordance with a number of embodiments of the present disclosure. Cleaning detection system 100 can include cleaning device base station 110, cleaning device 120, computing device 130 (e.g., a mobile device), computing device 130 located in a cloud computing environment 132, and a number of sensors 118. Cleaning device base station 110, cleaning device 120, computing device 130 (e.g., a mobile device), computing device 130 can includes processing resource 102 and memory resource 104. Cleaning device base station 110 and cleaning device 120 can include a computing device (e.g., computing device 130 having processing resource 102 and memory resource 104). A cleaning detection tool can be configured to run as an application on processing resource 102 and memory resource 104.

Cleaning device base station 110, cleaning device 120, computing device 130 (e.g., a mobile device), computing device 130 located in a cloud computing environment 132, and a number of sensors 118 can be configured to in communicate (e.g., via signals on a wireless and/or a direct connection) with each other. Cleaning device base station 110, cleaning device 120, computing device 130 (e.g., a mobile device), computing device 130 located in a cloud computing environment 132, and/or a number of sensors 118 can communicate inputs from sensors 118 to each other, status information of an area monitoring by the cleaning detection system 100, and/or instructions to perform operations. The operations can include cleaning operations, detection operations, and/or maintenance operations, among other types of operations.

Cleaning device 120 can include processing resource 102, memory resource 103, water receptacle 112, waste receptacle 116, cleaning supplies and tools 114, and sensors 118. Cleaning device 120 can be configured to removably coupled to cleaning device base station 110. Water source 112 can be used to provide water to cleaning device 120 for use when cleaning device 120 is performing a cleaning operation. Water receptacle 112 can also be used when performing cleaning operations to remove a stain or debris. Waste receptacle 116 can be configured to receive waste collected when performing cleaning operations. Waste receptacle 116 can be configured to be automatically emptied when cleaning device 120 is coupled to cleaning device base station 110. Cleaning supplies and tools 114 (e.g., cleaning chemicals, brushes, and/or vacuum attachments, among other types of cleaning supplies and tools) can be used to clean an area when performing a cleaning operation. Cleaning device 120 can dock at cleaning device base station 110 to charge a battery on the cleaning device 120, empty waste receptacle on cleaning device 120 into waste receptacle 116 on cleaning device base station 110, receive water at the water receptacle 112 from water source 112 on the cleaning device base station 110, and/or receive cleaning supplies and tools 114 from cleaning device base station 110.

Cleaning device base station 110 can include processing resource 102, memory resource 103, water source 112, waste receptacle 116, and cleaning supplies and tools 114. Cleaning device base station 110 can be configured to removably coupled to cleaning device 120. Cleaning device base station 110 can provide electrical power to charge a battery in cleaning device 120 when coupled to cleaning device 120. Water source 112 can be used to provide water to cleaning device 120 for use when cleaning device 120 is performing a cleaning operation. Water source 112 can also be used to perform maintenance operations on cleaning device 102, such as cleaning tools 114 on cleaning device 120. Waste receptacle 116 can be configured to receive waste 116 from cleaning device 120 that is collected when cleaning device 120 performs cleaning operations. Waste receptacle 116 can be configured to be manually emptied or automatically emptied at periodic intervals or when full. Cleaning supplies and tools 114 can be configured to provide cleaning supplies (e.g., clean chemicals) and/or cleaning tools (e.g., brushes and/or vacuum attachments) to cleaning device 120. Cleaning device 120 can dock at cleaning device base station 110 to charge a battery on the cleaning device 120, empty waste receptacle on cleaning device 120 into waste receptacle 116 on cleaning device base station 110, and/or receive cleaning supplies and tools 114 from cleaning device base station 110.

Computing device 130 can be configured to generate, store, and execute instructions to perform embodiments of the present disclosure using processing resource 102 and memory resource 104. The instructions to perform embodiments can be generated, stored, and executed by processing resource 102 and memory resource 104, which can be located on a mobile device (e.g., computing device 130 is a mobile device), on cleaning device base station 110, on cleaning device 120, and/or on computing device 130 located in a cloud computing environment 132.

Figure 2A:
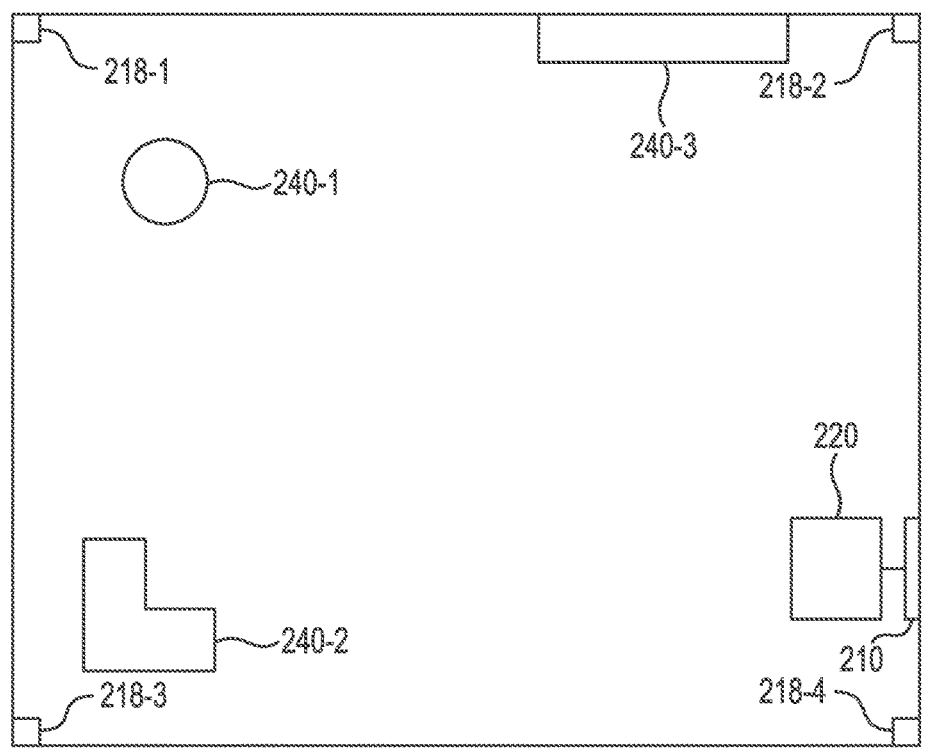
FIG. 2A is a diagram representing a baseline status of an example of environment for cleaning detection in accordance with a number of embodiments of the present disclosure.

FIG. 2A is a diagram representing a baseline status of an example of environment for cleaning detection in accordance with a number of embodiments of the present disclosure. FIG. 2A illustrates an area that the cleaning detection system can monitor. The area can be a house, a school, and/or an industrial building, for example, among other types of areas. In FIG. 2A, cleaning device 220 can include wheels, motors, and sensors to move about the area to generate initial data associated with the area. The initial data generated by the sensors can be sent to processing resources and/or memory resources to generate a baseline status of the area. The baseline status of the area can define the boundaries (e.g., walls and doorways) of the area, the location of obstacles 240-1, 240-2, and 240-3 in the area, and also an initial clean status of the area (e.g., a status that indicates the area is not in need of cleaning). The sensors (e.g., sensors 118) can be used to generate the initial data, along with sensors in cameras 218-1, 218-2, 218-3, and 218-4 positioned throughout the area that can be used to generate initial data.

Figure 2B:
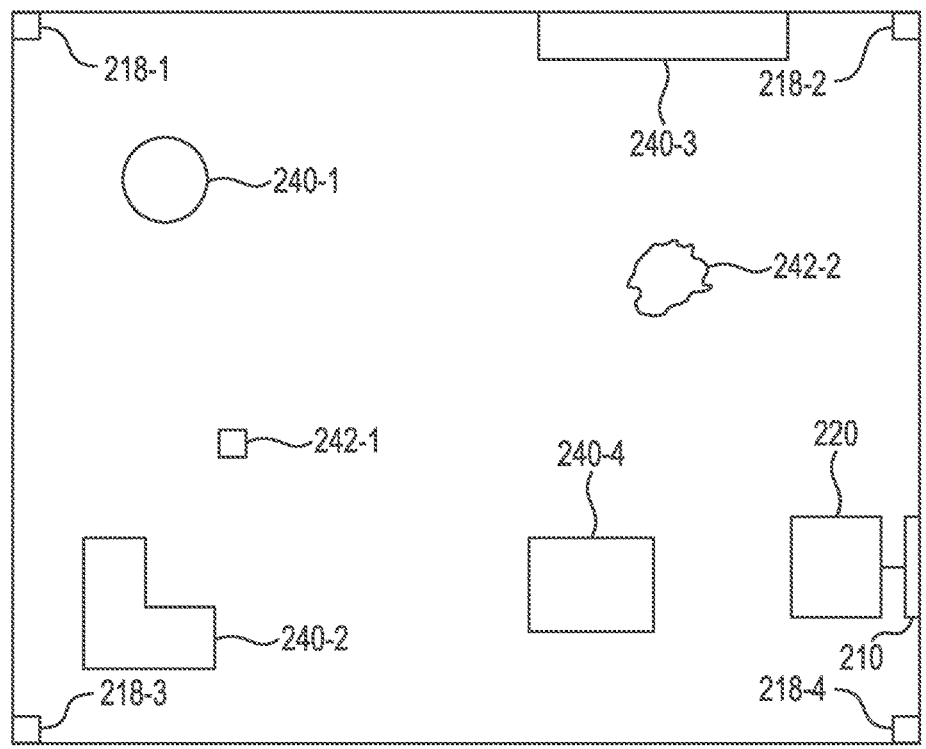
FIG. 2B is a diagram representing an updated status of an example of environment for cleaning detection in accordance with a number of embodiments of the present disclosure.

FIG. 2B is a diagram representing an updated status of an example of environment for cleaning detection in accordance with a number of embodiments of the present disclosure. FIG. 2B illustrates an area that the cleaning detection system can monitor. In FIG. 2B, cleaning device 220 can include wheels, motors, and sensors to move about the area to monitor the area and generate detection data associated with the area. Detection data can also be generated by sensors in cameras 218-1, 218-2, 218-3, and 218-4 positioned throughout the area. The detection data generated by the sensors can be sent to processing resources and/or memory resources to generate an updated status of the area. The detection data can be used generate an updated status of the area that indicates the area is in need of cleaning when the updated status is compared to the baseline status. The detection data can indicate that there is debris that needs to be cleaned at locations in the area. In FIG. 2B, the detection data can indicate that an object (e.g., dirt/dust pile) 242-1 and a liquid 242-2 are in the area scanned by the cleaning device 210. The location in the area of object 242-1 and liquid 242-2 can be indicated by the detection data and included in the updated status. The updated status can be compared to the baseline status, where the presence of object 242-1 and liquid 242-2 in the updated status and the absence of object 242-1 and liquid 242-2 in the baseline status can indicate that the area is need of cleaning. Instructions for the cleaning device 210 to perform a cleaning operation can be generated (e.g., by processing resource 102) and executed by cleaning device 210. The instructions for the cleaning operation can include the location of the area that needs to be cleaned and/or the route for the cleaning device 210 to travel to reach the area that needs to be cleaned (e.g., a route that is most efficient to reach the area that needs to be cleaned and/or avoid obstacles 240-1, 240-2, and 240-3). The instructions for the cleaning operation can include the type of debris (e.g., dirt or liquid) that is being cleaned and/or a type of cleaner and type of tool to clean the debris.

Figure 3:
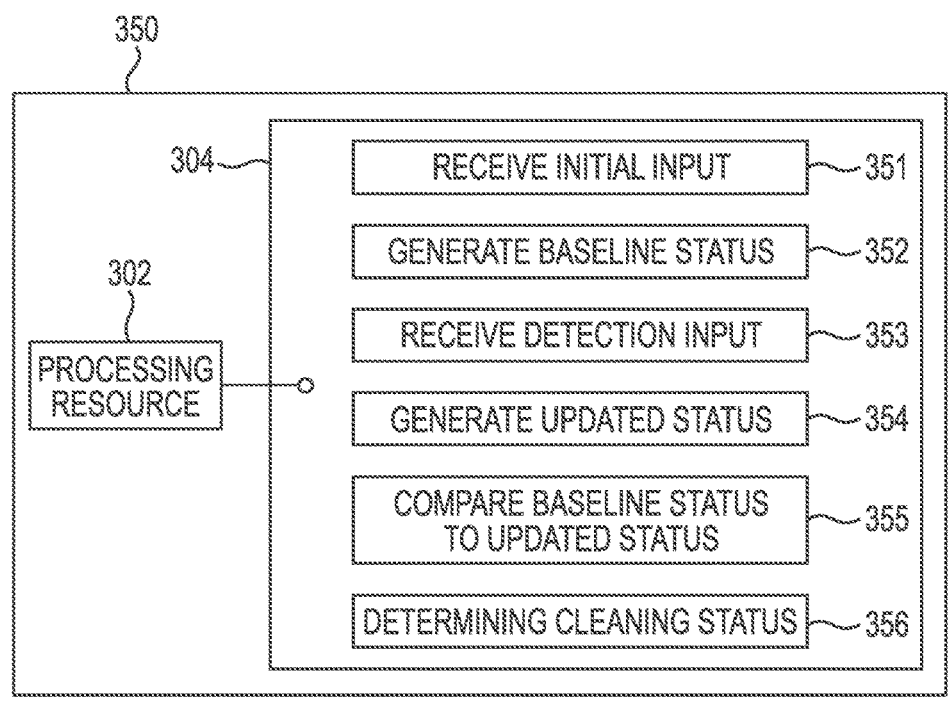
FIG. 3 is a functional diagram representing a processing resource in communication with a memory resource having instructions written thereon in accordance with a number of embodiments of the present disclosure.

FIG. 3 is a functional diagram representing a processing resource 302 in communication with a memory resource 304 having instructions 351, 352, 353, 354, 355, and 356 written thereon in accordance with a number of embodiments of the present disclosure. In some examples, the processing resource 302 and the memory resource 304 are located on a computing device or system 350 (e.g., a mobile device) such as the computing device 130 illustrated in FIG. 1, on cleaning device base station 110/210 illustrated in FIGS. 1 and 2, and/or on cleaning device 120/220 illustrated in FIGS. 1 and 2.

The system or device 350 illustrated in FIG. 3 can be a server or a computing device and can include the processing resource 302. The system or device 350 can further include the memory resource 304 (e.g., a non-transitory MRM), on which may be stored instructions, such as instructions 351, 352, 353, 354, 355, and 356. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 304 may be electronic, magnetic, optical, or other physical storage device that stores executable instructions. Thus, the memory resource 304 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 304 is a non-transitory MRM comprising Random Access Memory (RAM), an Electrically-Erasable Programmable ROM (EEPROM), a storage drive, an optical disc, and the like. The memory resource 304 may be disposed within a controller (e.g., microcontroller) and/or computing device. In this example, the executable instructions 351, 352, 353, 354, 355, and 356 can be "installed" on the device. Additionally, and/or alternatively, the memory resource 332 can be a portable, external or remote storage medium, for example, that allows the system to download the instructions 351, 352, 353, 354, 355, and 356 from the portable/external/remote storage medium. In this situation, the executable instructions may be part of an "installation package". As described herein, the memory resource 304 can be encoded with executable instructions associated with cleaning detection system.

The instructions 351, when executed by a processing resource such as the processing resource 302 can include instructions to receive, at the processing resource, the memory resource, or both, and from a first source (e.g., sensors 118) comprising a device (e.g., cleaning device and/or sensors) in communication with the device 350, first initial input data associated with an area. For instance, the initial input data can include data that defines the boundaries (e.g., walls and doorways) of the area, the location of obstacles in the area, and also an initial clean status of the area (e.g., a status that indicates the area is not in need of cleaning).

The instructions 352, when executed by a processing resource such as the processing resource 302, can include instructions to generate a baseline status of the area using the initial input data. The baseline status can include the location of obstacles in the area and also include initial data associated with a clean area.

The instructions 353, when executed by a processing resource such as the processing resource 302, can include instructions a first source (e.g., sensors 118) comprising a device (e.g., cleaning device and/or sensors) in communication with the device 350, detection inputs associated with an area.

The instructions 354, when executed by a processing resource such as the processing resource 302, can include instructions to generate an updated status based upon the detection inputs. The updated status can indicate that there is debris that is need of cleaning. The detection data from sensors on the cleaning device and/or from sensors in the area that is being monitored can be received and monitored to determine the updated status.

The instructions 355, when executed by a processing resource such as the processing resource 302, can include instructions to compare the baseline status to the updated status. The comparison of the baseline status to the updated status can determine if there are any difference between the baseline status and the updated status. Any differences between the baseline status and the updated status can be analyzed to determine if the differences are debris that can be cleaned by the cleaning device.

The instructions 356, when executed by a processing resource such as the processing resource 302, can include instructions to determine a cleaning status of the area based on the comparison of the baseline status to the updated status. If differences between the baseline status and the updated status indicate that the area has debris that can be clean, operational instructions are generated and sent to the cleaning device to clean the debris. If differences between the baseline status and the updated status indicate that there is not debris in the area has debris to clean or if there are no differences between the baseline status and the updated status, instructions are generated and sent to the cleaning device to clean the debris, no action can be taken or an indication can be sent to the cleaning device that the area is not in need of cleaning.

In some examples, the memory resource 304 can include instructions executable to transmit the operational instructions to cloud storage. For instance, the memory resource 304 may be a buffer memory resource configured to temporarily store data such that the operational instructions and/or other data are transmitted to cloud storage and may be accessed as needed by a cleaning device.

The memory resource 304 can include instructions executable to instruct hardware of the cleaning device to perform a physical task associated with the operational instructions, in some examples. For instance, the operational instructions may include the type of cleaning tool and/or cleaner to use during the cleaning operation. The operational instructions can also include the route for the cleaning device to take when traveling to begin the cleaning operation, while performing the cleaning operation, and when traveling to return the cleaning device base station.

In some examples, the memory resource 332 can include instructions executable to track a status of the cleaning device before transmission of the operational instructions to the device and in response to receiving the indication of performance of the operational instructions by the device. For example, the cleaning device can receive a current status from the cleaning device before the cleaning device begins its task, while it performs the task, after it performs the task, or any combination thereof. The device 350 may receive status updates from the cleaning device regarding battery life, condition of cleaning tools, condition/level of cleaning supplies, etc. The status updates can be provided prior to performing a cleaning operation and/or after performing a cleaning operation.

In some examples, the memory resource 332 can include instructions executable to assess the cleaning detection system and transmit a result of the assessment to a computing device. For instance, the cleaning device may be due for scheduled maintenance or have an underperforming component. For instance, cleaning supplies in the cleaning device may need refilling or a battery may need replacement. This information can be transmitted to the computing device to notify a user or other recipient that action is requested.

Figure 4:
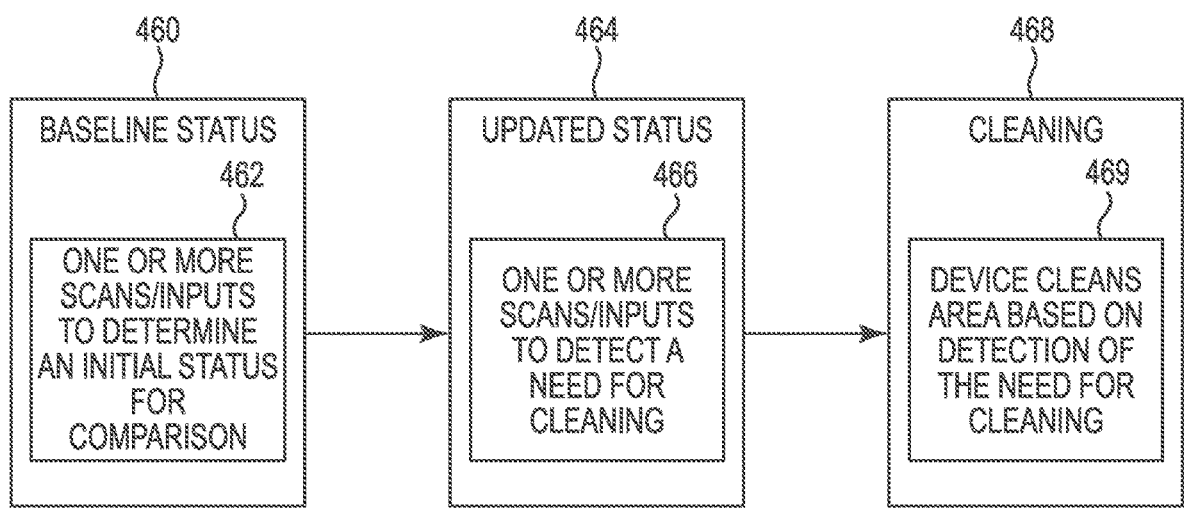
FIG. 4 is a functional diagram representing phases of cleaning detection in accordance with a number of embodiments of the present disclosure.

FIG. 4 is a functional diagram representing phases of cleaning detection in accordance with a number of embodiments of the present disclosure. A cleaning detection system can generate a baseline status 460 of an area that is being monitored by the cleaning detection system. The cleaning detection system can receive data from sensors in one or more scans to determine an initial status for comparison 462. The initial status can be the baseline status for an area that indicates a clean status for the area. The baseline status can be updated over time with data from sensors of the cleaning detection system. For example, as flooring wears over time, the such the baseline status can include the wear marks on the flooring as being part of the clean status for the area, so the cleaning detection system does not attempt to clean the wear marks on the floor.

A cleaning detection system can generate an updated status 464 of an area that is being monitored by the cleaning detection system. The cleaning detection system can receive detection data from sensors in one or more scans to determine an updated status to detect a need for cleaning 466. The updated status can include information associated with the detection data from the sensors. The updated status can be generated at periodic intervals or in response to receiving a request to generate the updated status from a user. The need for cleaning can be determined by comparing the baseline status to the updated status.

A cleaning detection system can perform a cleaning operation 468 on an area that is being monitored by the cleaning detection system. The cleaning detection system can receive and execute instructions for the cleaning device to clean the area based on the detection of the need for cleaning 469.

Figure 5:
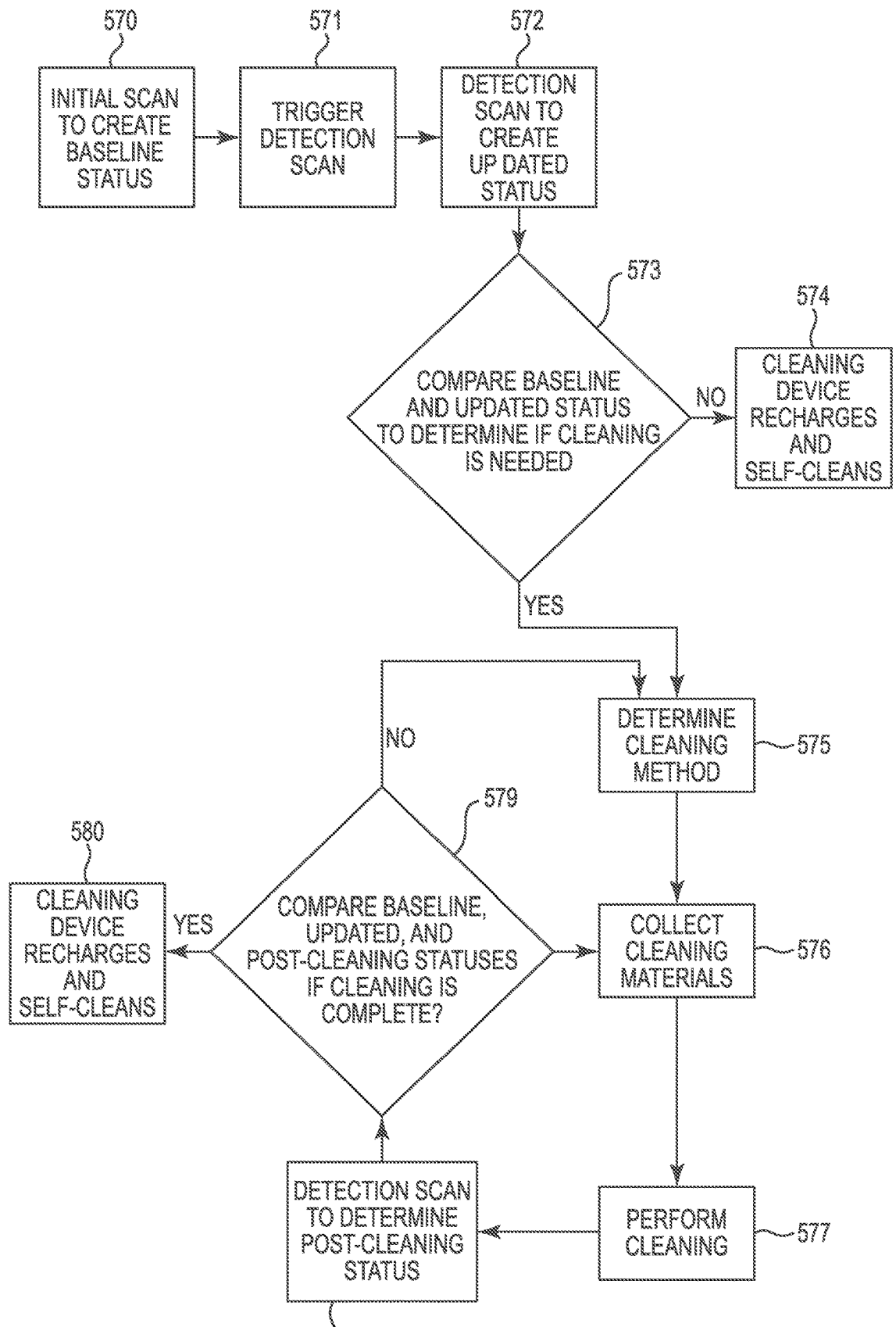
FIG. 5 is a flow diagram representing an example method associated with cleaning detection in accordance with a number of embodiments of the present disclosure.

FIG. 5 is a flow diagram representing an example method associated with cleaning detection in accordance with a number of embodiments of the present disclosure. The method may be performed, in some examples, using a system and/or a device such as devices 110, 120, 130, 118, 210, 220, and 350, as described with respect to FIGS. 1-3.

At 570, an initial scan can be performed to create a baseline status. The baseline status can be based upon initial inputs form sensors on the cleaning device and/or sensors that monitor the area. The baseline status can represent a clean status of the area, where the area is not in need of a cleaning.

At 571, a detection scan can be triggered. A detection scan can be triggered at periodic intervals, such as each evening when the area is not in use. A detections scan can also be triggered by a user at any desired time.

At 572, the detection scan can be used to create an updated status. The updated status can receive detection data from sensors on the cleaning device and/or by sensor monitoring the area. The updated status can include data that indicates there is debris that is need of cleaning.

At 573, the baseline status and the updated status can be compared to determine if cleaning is needed. If differences between the baseline status and the updated status indicate that the area has debris that can be clean, operational instructions are generated and sent to the cleaning device to clean the debris. If differences between the baseline status and the updated status indicate that there is not debris in the area has debris to clean or if there are no differences between the baseline status and the updated status, instructions are generated and sent to the cleaning device to clean the debris, no action can be taken or an indication can be sent to the cleaning device that the area is not in need of cleaning.

At 574, if it is determined that cleaning is not needed, the cleaning device returns to the cleaning device base station to recharge and self-clean. The cleaning device can prepare for the next detection scan by charging the battery.

At 575, if it is determined that cleaning is needed, the cleaning method is determined. The type of cleaning tools and/or cleaning supplies can be determined based on the type of debris that is to be cleaned.

At 576, the cleaning device collects the cleaning materials for the cleaning operation. The cleaning materials can be collected from the cleaning device base station and can include cleaner tools and cleaners.

At 577, the cleaning device performs the cleaning operation. The cleaning device can execute instructions to perform the cleaning operation by vacuuming, scrubbing, brushing, etc. the debris that is being cleaning.

At 578, a detection scan can be performed and used to create a post-cleaning status. The post-cleaning status can be determined using detection data that is generated after the cleaning operation. The post-cleaning status can be used to determine if the cleaning operation effectively cleaned the debris.

At 579, the baseline status and the post-cleaning status can be compared to determine if cleaning was successful or if the area needs to be cleaned again. If the comparison of the baseline status of the and the post-cleaning status indicates that the area needs to be cleaned again, the method returns to step 575 and continues. If the comparison of the baseline status of the and the post-cleaning status indicates that the cleaning was successful and the area does not need to be cleaned again, at 580, the cleaning device returns to the cleaning device base station to recharge and self-clean.

Figure 6:
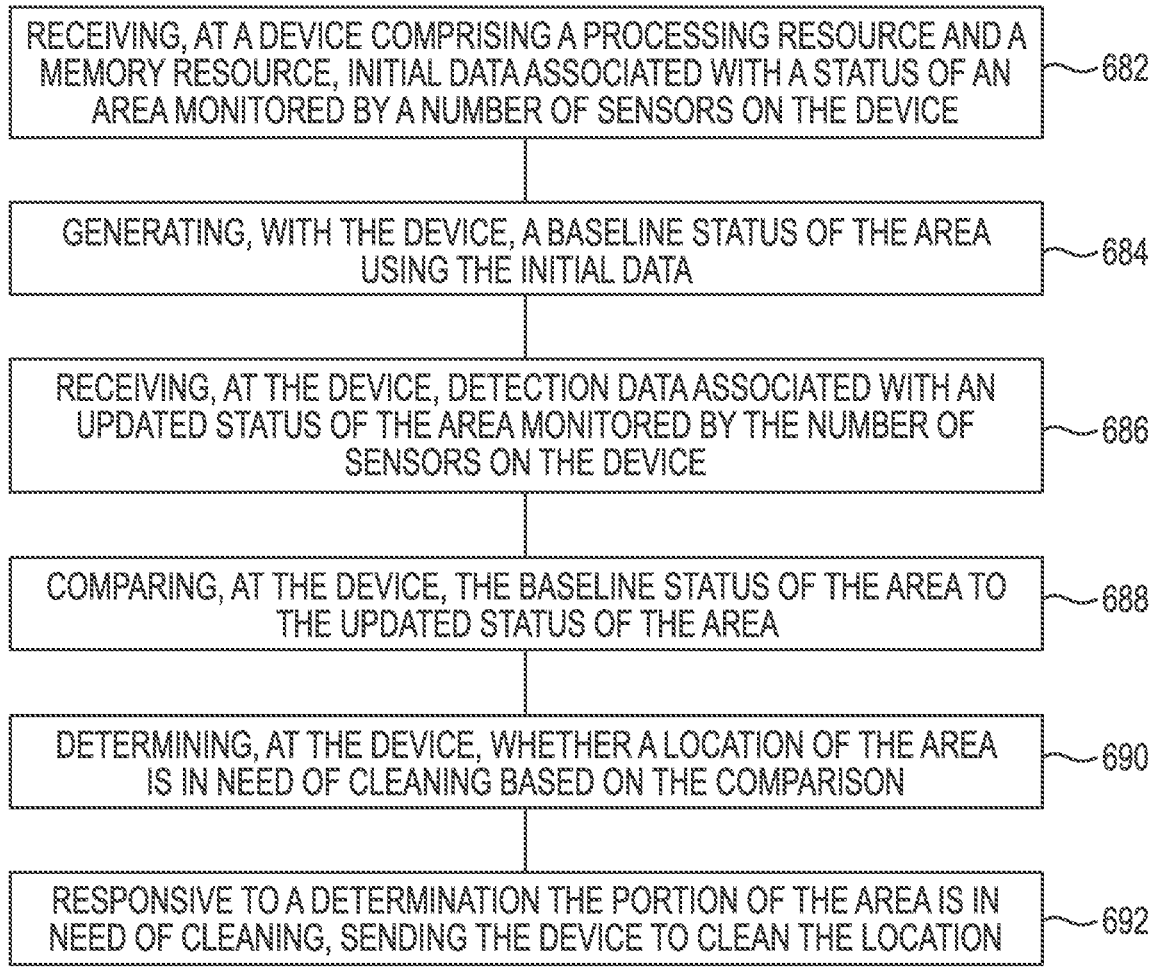
FIG. 6 is a flow diagram representing an example method associated with cleaning detection in accordance with a number of embodiments of the present disclosure.

FIG. 6 is a flow diagram representing an example method associated with cleaning detection in accordance with a number of embodiments of the present disclosure. The method may be performed, in some examples, using a system and/or a device such as devices 110, 120, 130, 118, 210, 220, and 350, as described with respect to FIGS. 1-3.

At 682, the method receiving, at a device comprising a processing resource and a memory resource, initial data associated with a status of an area monitored by a number of sensors on the device. The computing device, cleaning device, sensors, and/or the cleaning device base station may be in communication with one another via wired or wireless connections such that the computing device, cleaning device, sensors, and/or the cleaning device base station can share data with one another.

The initial data received at the device can include sensor data associated with a scan of an area that is received from a sensor in communication with the device.

At 684, the method includes generating, with the device, a baseline status of the area using the initial data. The baseline status can be based upon initial inputs form sensors on the cleaning device and/or sensors that monitor the area. The baseline status can represent a clean status of the area, where the area is not in need of a cleaning.

At 686, the method receiving, at the device, detection data associated with an updated status of the area monitored by the number of sensors on the device. The detection data can include image data, infrared data, moisture detection data, among other type of data, from sensors on the cleaning device and/or sensors that are monitoring the area.

At 688, the method includes comparing, at the device, the baseline status of the area to the updated status of the area. The baseline status is a status that is associated with the area being a clean state that is not in need of cleaning. The updated status can be based on detection data that indicates there is debris in need of cleaning. Any differences between the baseline status and the updated status can indicate the area is need of cleaning.

At 690, the method includes determining, at the device, whether a location of the area is in need of cleaning based on the comparison. If differences between the baseline status and the updated status indicate that the area has debris that can be clean, operational instructions are generated and sent to the cleaning device to clean the debris. If differences between the baseline status and the updated status indicate that there is not debris in the area has debris to clean or if there are no differences between the baseline status and the updated status, instructions are generated and sent to the cleaning device to clean the debris, no action can be taken or an indication can be sent to the cleaning device that the area is not in need of cleaning.

At 692, the method includes responsive to a determination the portion of the area is in need of cleaning, sending the device to clean the location. For instance, the device can send instructions via a wired or wireless connection to the cleaning device with respect to performing the cleaning operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a processing resource; and
a memory resource in communication with the processing resource having instructions executable to:
receive, at the processing resource, the memory resource, or both, and from a number of sensors on a device, a number of sensors on a base station associated with the device, and a number of sensors located throughout an area in communication with the apparatus, a number of initial inputs associated with the area being continuously scanned by the number of sensors on the device, the number of sensors on the base station, and the number of sensors located throughout the area;
determine, at the processing resource, a baseline status of the area based on the number of initial inputs provided by the continuous scanning of the number of sensors on the device, the number of sensors on the base station associated with the device, and the number of sensors located throughout the area, wherein the baseline status corresponds to a clean status of the area;
receive, at the processing resource, the memory resource, or both, and from the number of sensors on the device, the number of sensors on the base station associated with the device, and the number of sensors located throughout the area in communication with the apparatus, a number of first detection inputs associated with the area being continuously scanned and an obstacle location;
receive, at the processing resource, the memory resource, or both, a number of second detection inputs from the number of sensors on the device, the number of sensors on the base station associated with the device, and the number of sensors located throughout the area being continuously scanned;
determine, at the processing resource, whether a location of the area is in need of cleaning based on a comparison of the baseline status and the number of first detection inputs or the number of second detection inputs;
send, via the processing resource, the memory resource, or both, operational instructions to the device to perform a cleaning operation in response to a determination that the location is in need of cleaning;
update, at the processing resource, the memory resource, or both, the baseline status of the area based on the number of first detection inputs and the number of second detection inputs corresponding to a plurality of surface features of the area associated with wear over a period of time, wherein the corresponding clean status includes the plurality of surface features of the area associated with wear such that the plurality of surface features of the area associated with wear are excluded from the cleaning operation;
determine, at the processing resource, that a particular location of the area is in need of cleaning based on the baseline status of the area not including at least one of the plurality of surface features included in the updated baseline status when continuously monitoring the area via the number of second detection inputs;
track a status of the device before performing the cleaning operation, during the cleaning operation, and after the cleaning operation;
determine a refill status by:
accessing a cleaning supply level in the device; and
transmitting the accessed cleaning supply level to an external source; and
based on the determined refill status, return to the base station associated with the device responsive to a recall command from the external source.

2. The apparatus of claim 1, wherein the apparatus is configured to receive, at the processing resource, the memory resource, or both, an indication of performance of the cleaning operation by the device.

3. The apparatus of claim 1, wherein the apparatus is configured to receive, at the processing resource, the memory resource, or both, an indication that the cleaning was not adequate and to perform the cleaning again.

4. The apparatus of claim 3, wherein the apparatus is configured to send, via the processing resource, the memory resource, or both, operational instructions to the device to perform another cleaning operation on the location using different tools and cleaners.

5. The apparatus of claim 1, wherein the apparatus is configured to update, at the processing resource, the memory resource, or both, the baseline status based upon further detection inputs received after performing the cleaning operation.

6. The apparatus of claim 1, wherein the number of sensors on the device, the number of sensors on the base station associated with the device, and the number of sensors located throughout the area include a number of cameras.

7. The apparatus of claim 1, wherein the apparatus is configured to compare a post-cleaning updated status of the area to both the baseline status and a pre-cleaning operation updated status to determine if the cleaning operation was successful.

8. A system, comprising:
a first device comprising a first processing resource, a first memory, and a number of sensors, wherein the first processing resource is configured to execute instructions stored on the first memory; and
a second device comprising a second processing resource, a second memory, wherein the first device and the second device are communicatively coupled to each other and wherein the second processing resource is configured to execute instructions stored on the second memory to:
receive initial data and an obstacle location associated with a status of an area being continuously monitored by a number of sensors on the first device, a number of sensors on the second device, and a number of sensors located throughout the area;
generate a baseline status of the area using the initial data provided by the continuous monitoring of the number of sensors on the first device, the number of sensors on the second device, and the number of sensors located throughout the area, wherein the baseline status corresponds to a clean status of the area;
receive detection data associated with an updated status of the area being continuously monitored by the number of sensors on the first device, the number of sensors on the second device, and the number of sensors located throughout the area;
compare the baseline status of the area to the updated status of the area;

determine whether a location of the area is in need of cleaning based on the comparison;

responsive to a determination the location of the area is in need of cleaning, send instructions to the first device to clean the location;

track a status of the first device before cleaning the location, while cleaning the location, and after cleaning the location;

update, at the processing resource, the memory resource, or both, the baseline status of the area based on the received detection data corresponding to a plurality of surface features of the area associated with wear over a period of time, wherein the corresponding clean status includes the plurality of surface features of the area associated with wear such that the plurality of surface features of the area associated with wear are excluded from the cleaning of the location;

determine, at the processing resource, that a particular location of the area is in need of cleaning based on the baseline status of the area not including at least one of the plurality of surface features included in the updated baseline status when continuously monitoring the area via the number of sensors on the first device, the number of sensors on the second device, and the number of sensors located throughout the area;

determine a refill status by accessing a cleaning supply level in the first device; and based on the determined refill status, recall the first device to the second device using a recall command from the second processing resource, wherein the second device is a base station associated with the first device.

9. The system of claim 8, wherein the first processing resource is configured to execute instructions to send detection data representing the updated status of the location to the second device at periodic intervals.

10. The system of claim 8, wherein the second processing resource is configured to execute instructions to provide a type of cleaner and type of tool to clean the location.

11. The system of claim 8, wherein the first processing resource is configured to receive instructions from the second device to clean the location and execute the instructions to cause the first device to clean the location.

12. The system of claim 8, wherein the second processing resource is configured to execute instructions to receive an indication that the location is cleaned and to receive data representing a further updated status of the location.

13. The system of claim 12, wherein the first device returns to the second device after cleaning the location to recharge, dump waste, and collect fresh cleaning supplies.

14. The system of claim 8, wherein the instructions include a route for the first device to take when cleaning the location.

15. The system of claim 8, wherein the second device is a mobile device.

16. A method, comprising:

receiving, at a device comprising a processing resource and a memory resource, initial data associated with a status of an area being continuously monitored by a number of sensors on the device, a number of sensors on a base station associated with the device, and a number of sensors located throughout an area;

generating, with the device, a baseline status of the area using the initial data provided by the continuous monitoring of the number of sensors on the device, the number of sensors on the base station associated with the device, and the number of sensors located throughout the area, wherein the baseline status corresponds to a clean status of the area;

receiving, at the device, detection data and an obstacle location associated with an updated status of the area being continuously monitored by the number of sensors on the device, the number of sensors on the base station associated with the device, and the number of sensors located throughout the area;

comparing, at the device, the baseline status of the area to the updated status of the area;

determining, at the device, whether a location of the area is in need of cleaning based on the comparison;

responsive to a determination the location of the area is in need of cleaning, sending the device to clean the location;

tracking a status of the device before cleaning the location, while cleaning the location, and after cleaning the location;

updating, at the processing resource, the memory resource, or both, the baseline status of the area based on the detection data corresponding to a plurality of surface features of the area associated with wear over a period of time, wherein the corresponding clean status includes the plurality of surface features of the area associated with wear such that the plurality of surface features of the area associated with wear are excluded from the cleaning of the location;

determining, at the processing resource, that a particular location of the area is in need of cleaning based on the baseline status of the area not including at least one of the plurality of surface features included in the updated baseline status when continuously monitoring the area via the number of sensors on the device, the number of sensors on the base station associated with the device, and the number of sensors located throughout the area;

determining a refill status by:
  accessing a cleaning supply level in the device; and
  transmitting the accessed cleaning supply level to an external source; and based on the determined refill status, returning to the base station associated with the device responsive to a recall command from the external source.

17. The method of claim 16, further comprising determining a type of spill at a particular portion of the area based on the detection data.

18. The method of claim 16, further comprising determining a type of cleaner to deploy to a particular portion of the area based on the detection data.

19. The method of claim 16, further comprising receiving further detection data at periodic intervals in response to determining that the area does not need cleaning based on previously received detection data.

20. The method of claim 16, further comprising updating the baseline status based on the detection data.

* * * * *